(12) United States Patent
Kotary et al.

(10) Patent No.: US 11,429,496 B2
(45) Date of Patent: Aug. 30, 2022

(54) PLATFORM DATA RESILIENCY MECHANISM

(71) Applicant: Intel Corporation, Santa Clara, CA (US)

(72) Inventors: Karunakara Kotary, Portland, OR (US); Prashant Dewan, Portland, OR (US); Vincent Zimmer, Issaquah, WA (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 17/132,227

(22) Filed: Dec. 23, 2020

(65) Prior Publication Data

US 2021/0109824 A1    Apr. 15, 2021

(51) Int. Cl.
*G06F 12/00* (2006.01)
*G06F 11/14* (2006.01)
*G06F 11/20* (2006.01)
*G06F 9/4401* (2018.01)

(52) U.S. Cl.
CPC ........ *G06F 11/1469* (2013.01); *G06F 9/4401* (2013.01); *G06F 11/1451* (2013.01); *G06F 11/2053* (2013.01)

(58) Field of Classification Search
None
See application file for complete search history.

(56) References Cited

U.S. PATENT DOCUMENTS

2013/0205063 A1* 8/2013 Zhang ................. G06F 11/1456
711/E12.008

* cited by examiner

*Primary Examiner* — Daniel D Tsui
(74) *Attorney, Agent, or Firm* — Jaffery Watson Mendonsa & Hamilton LLP (57) ABSTRACT

An apparatus to facilitate data resiliency in a computer system platform is disclosed. The apparatus comprises a non-volatile memory to store data resiliency logic and one or more processors to execute the data resiliency logic to collect boot critical data from a plurality of platform components and store the data within the non-volatile memory.

22 Claims, 9 Drawing Sheets

PLATFORM DATA RESILIENCY MECHANISM

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third party components via a standardized on-die interconnect protocol. However, the addition of such components may lead to security vulnerabilities.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for disclosure may admit other equally effective embodiments.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a mechanism is provided to facilitate data resiliency in a computer system platform. In such embodiments, the mechanism collects boot critical data from a plurality of platform components and store the data as backup data for use in a resiliency recovery process performed during a system boot.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
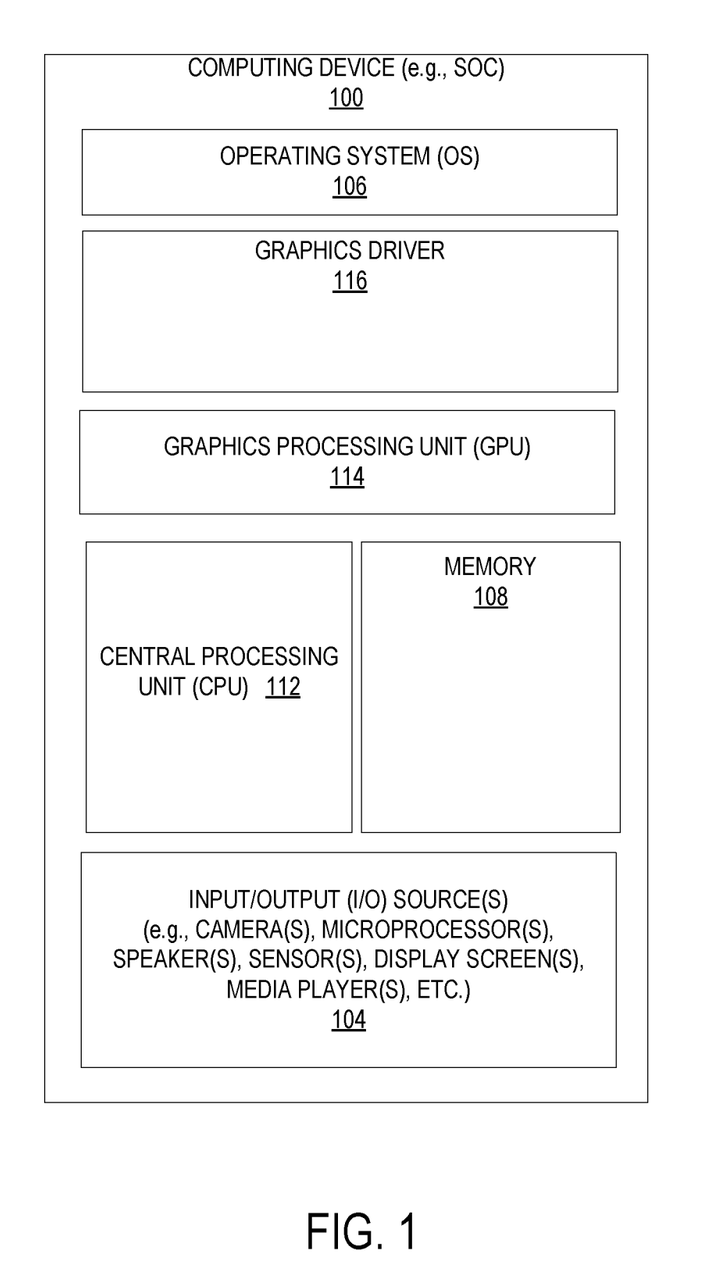
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2A:
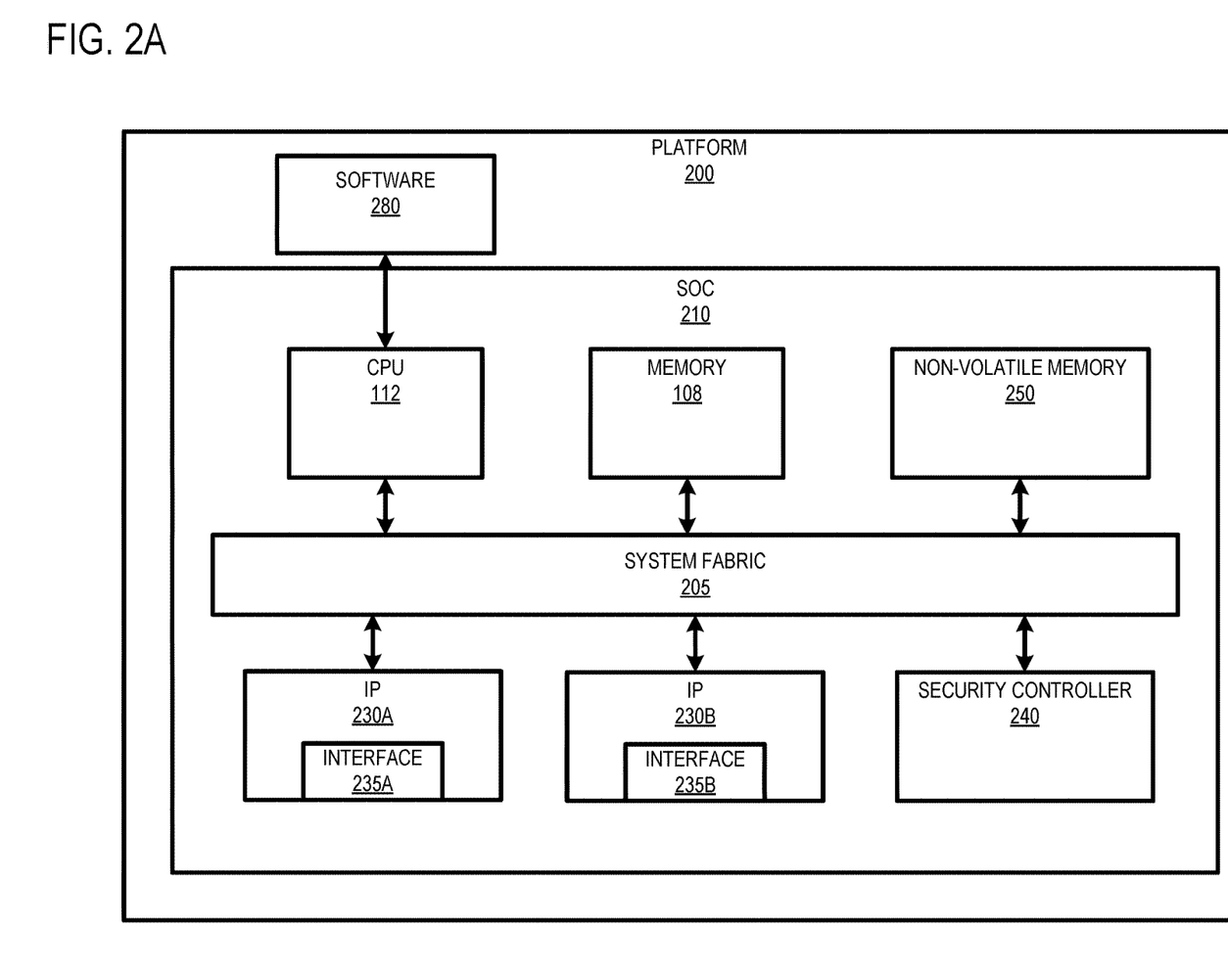
FIGS. 2A-2C illustrate embodiments of a platform.
Figure 2B:
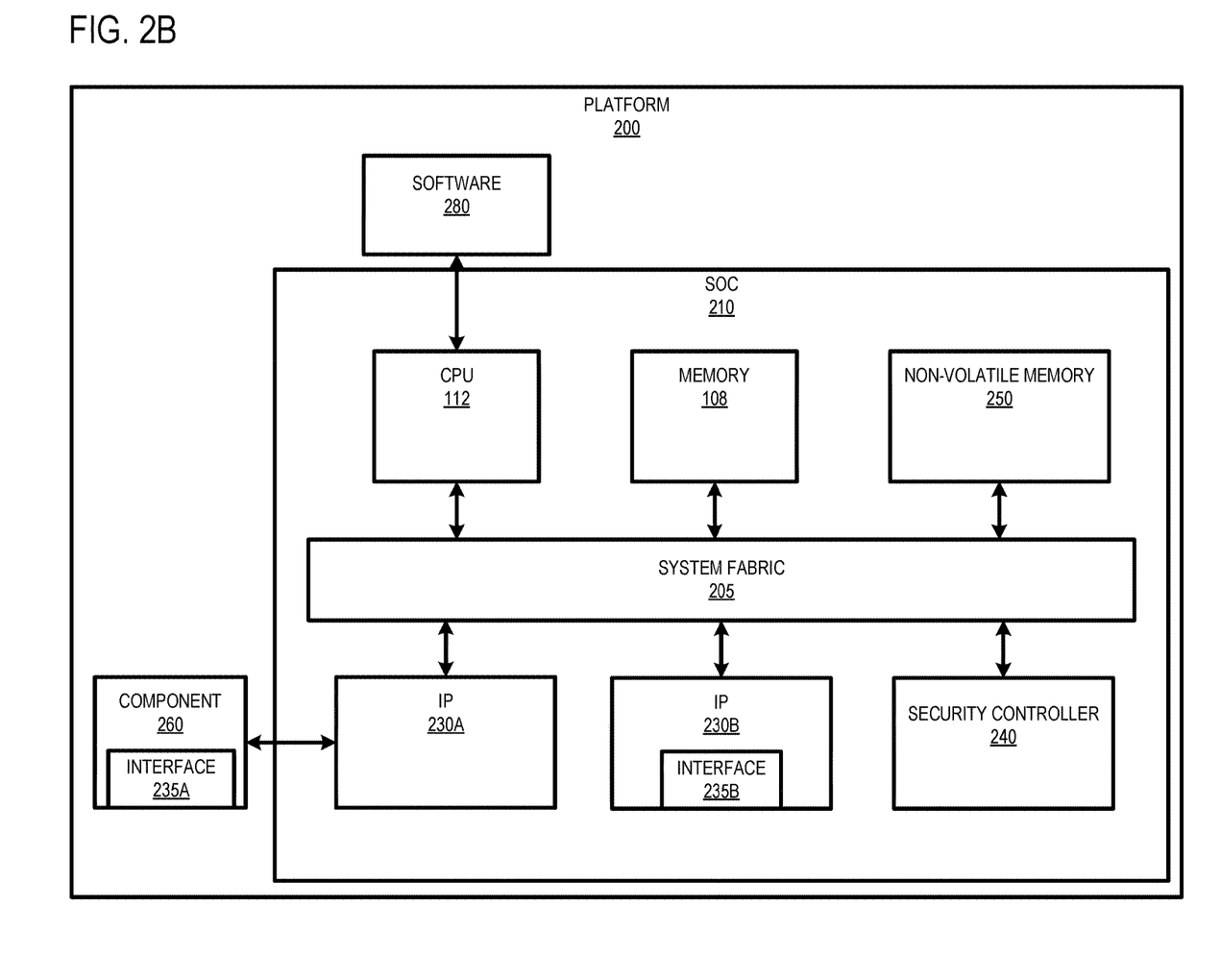
Figure 2C:
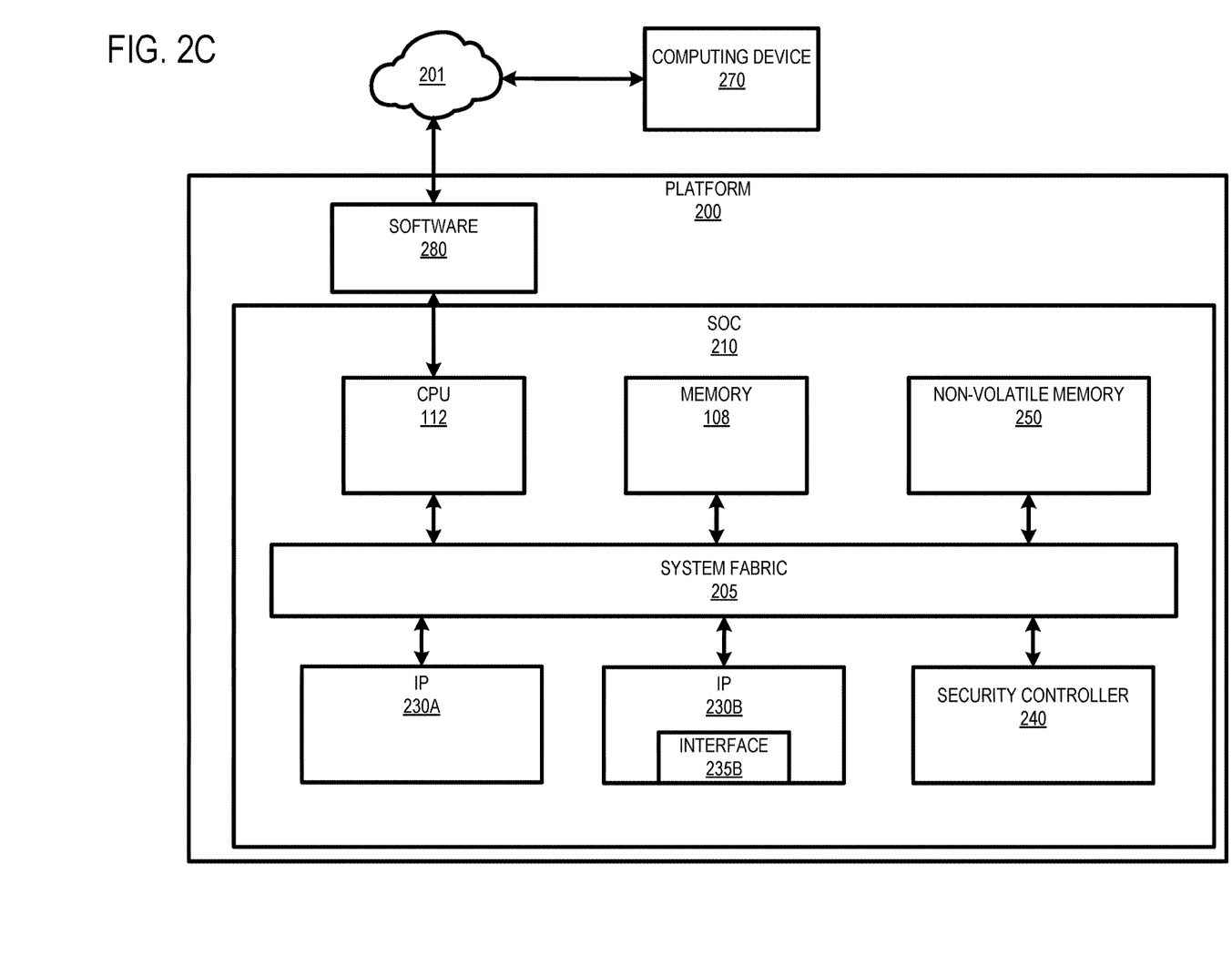

FIGS. 2A-2C illustrate embodiments of a platform 200 including a SOC 210 similar to computing device 100 discussed above. As shown in FIG. 2A, platform 200 includes SOC 210 communicatively coupled to one or more software components 280 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP agents 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., interfaces 235A and 235B) to provide standardization to enable the IP agent 230 to communicate with SOC 210 components. For example, in an embodiment in which IP agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IPA agent 230 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives. In one embodiment, non-volatile memory 250 is implemented to store the platform 200 firmware. For example, non-volatile memory 250 stores boot (e.g., Basic Input/Output System (BIOS)) and device (e.g., IP agent 230 and security controller 240) firmware.

FIG. 2B illustrates another embodiment of platform 200 including a computing device 270 coupled to SOC 210 via IP 230A. In one embodiment, IP 230A operates as a bridge, such as a PCIe root port, that connects component 260 to SOC 210. In this embodiment, component 260 may be implemented as a PCIe device (e.g., switch or endpoint) that includes a hardware interface 235 to enable component 260 to communicate with SOC 210 components. FIG. 2C illustrates yet another embodiment of platform 200 including a computing device 270 coupled to platform 200 via a cloud network 201. In this embodiment, computing device 270 comprises a cloud agent that is provided access to SOC 210 via software 280.

Currently, attacks by malicious agents on platform 200 firmware (e.g., non-volatile memory 250, IP agents 230, security controller 240, etc.) are on the rise. Such firmware attacks result in privacy data leaks, system downtime that negatively impact businesses. Additionally, these attacks have resulted in the National Institute of Standards and Technology releasing a Special Publication for Platform Firmware Resiliency titled the NIST SP800-193, which set firmware resiliency guidelines and requirements.

Typical implementations of firmware resiliency include a secondary firmware copy installed on a platform flash component. With multiple firmware components on the platform, and all OEMs striving to meet the compliance, platform flash needs have grown, thus increasing overall cost of the OEM Platforms. Currently most client platform firmware on systems can fit within a 32 MB serial peripheral interface (SPI) flash. However, current systems provide firmware, but not data, resiliency.

According to one embodiment, BIOS is configured to include data resiliency logic. In such an embodiment, the data resiliency logic includes a platform data resiliency component (PDRC) that collects encrypted boot critical data from system IP agents and boot critical device firmware agents (e.g., non-volatile memory, trusted platform module (TPM), etc.) and persist the data in non-volatile storage. In such embodiments, the PDRC determines during the platform boot whether one or more IP agents require data recovery and reads the data from non-volatile storage to provide that to those IP agents. In a further embodiment, an interface between the PDRC and IP agents is provided for reporting data and recovery status.

Figure 3:
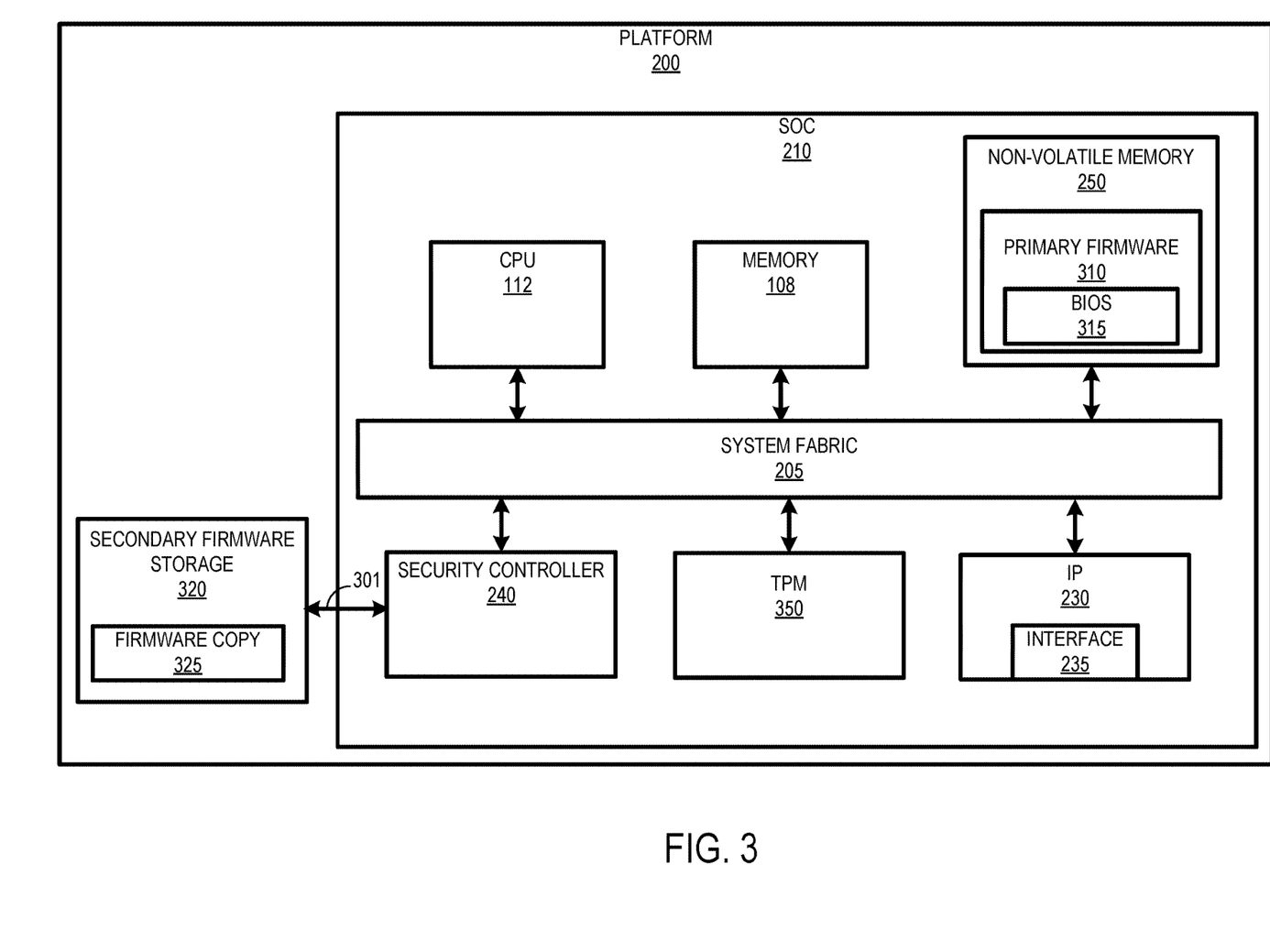
FIG. 3 illustrates another embodiment of a platform.

FIG. 3 illustrates yet another embodiment of platform 200 including secondary firmware storage 320 coupled to security controller 240. As mentioned above, non-volatile memory 250 is implemented as a storage for platform firmware (e.g., primary firmware 310). In one embodiment, resiliency support is provided for primary firmware 310 stored in non-volatile memory 250. As defined herein, platform firmware resiliency describes security mechanisms for protecting platform against unauthorized changes, detecting unauthorized changes that occur and recovering from attacks. In a further embodiment, the primary firmware 310 is restored in order to bring back the system to a bootable state upon detection of corruption and/or failure.

Secondary firmware storage 320 (or resiliency firmware source) is implemented to store a backup (or secondary) copy of the primary firmware (or firmware copy) 325 stored in non-volatile memory 250. In one embodiment, the backup firmware is used to restore the firmware stored in non-volatile memory 250 upon detecting unauthorized access to primary firmware 310 (e.g., firmware attacked or corrupted). In yet a further embodiment, requirements are implemented at secondary firmware storage 320 to prevent the attacks or failures that may occur at primary firmware 310. Such requirements include, writes to secondary firmware storage 320 being totally isolated from primary firmware 310; secondary firmware storage 320 having higher levels of protection than non-volatile memory 250; secondary firmware storage 320 being used and accessed only during recovery flows and when updated in a secure manner, and not during normal boot; and secondary firmware storage 320 only being updated by an authenticated update, and in case of some corruption, being restored by a root of trust for the region.

In embodiments, secondary firmware storage 320 may be implemented via universal flash storage (UFS) or NVMe. In further embodiments, secondary firmware storage 320 may be implemented as block storage or remote cloud storage (e.g., via cloud network 201 shown in FIG. 2C) that is accessed via an out of band (OOB) interface 301. In still further embodiments, the source of secondary firmware storage 320 may be dynamically selected (e.g., from UFS, NVMe, block storage, cloud storage, etc.). In such embodiments, one of these sources may be selected based on a configuration policy for replacing secondary firmware storage 320 upon a determination that the secondary firmware storage 320 has been corrupted. Platform 200 also includes TPM 350 implemented to secure platform 200 using integrated cryptographic keys.

Figure 4:
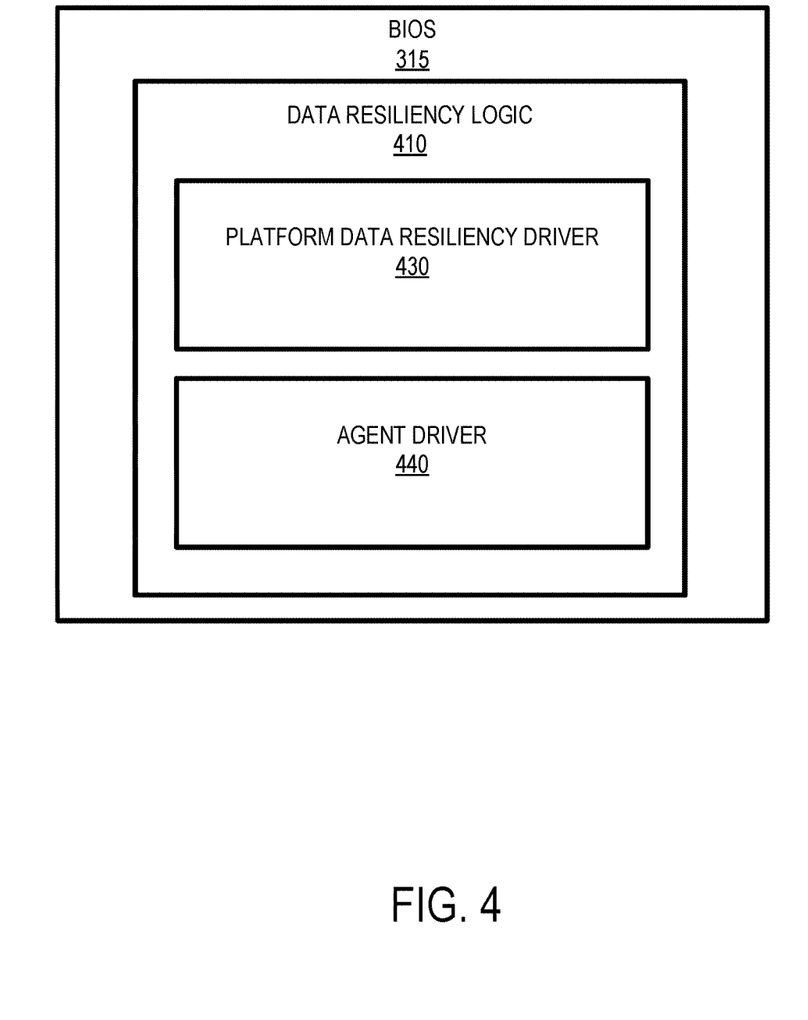
FIG. 4 illustrates one embodiment of Basic Input/Output System components.

According to one embodiment, primary firmware 310 at non-volatile memory 250 includes BIOS 315, which is executed by CPU 112 to perform hardware initialization during the booting process (power-on startup). Additionally, firmware copy 325 within secondary firmware storage 320 may include a BIOS copy. FIG. 4 illustrates one embodiment of BIOS 315, which includes data resiliency logic 410 having PDRC 430 and agent driver 440. As mentioned above, PDRC 430 collects encrypted boot critical data from platform components (e.g., IP agents 230, non-volatile memory 250 and TPM 350) and stores the data in non-volatile memory 250 to provide data resiliency. Additionally, PDRC 430 provides the stored resiliency data to platform components that require data recovery during system boot. In a further embodiment, PDRC 430 may also store a redundant copy of the boot critical data external to SOC 210.

For example, the redundant copy may be stored in secondary storage 320, or in cloud storage where the data can be retrieved via an out of band interface.

Agent driver 440 is implemented to provide an interface between PDRC 430 and the platform components. In one embodiment, PDRC 430 invokes agent driver 440 to determine whether any of the platform components requires data resiliency backup. In such an embodiment, agent driver 440 transmits a query to each component to check whether the component requests resiliency data backup (or resiliency backup). For example, agent driver 440 transmits separate queries to IP agent 230, security controller 240 and TPM 350. Upon a determination that resiliency backup has been requested, agent driver 440 retrieves encrypted data from each component that requests resiliency backup support and stores the data in non-volatile memory 250 as resiliency backup data.

Figure 5:
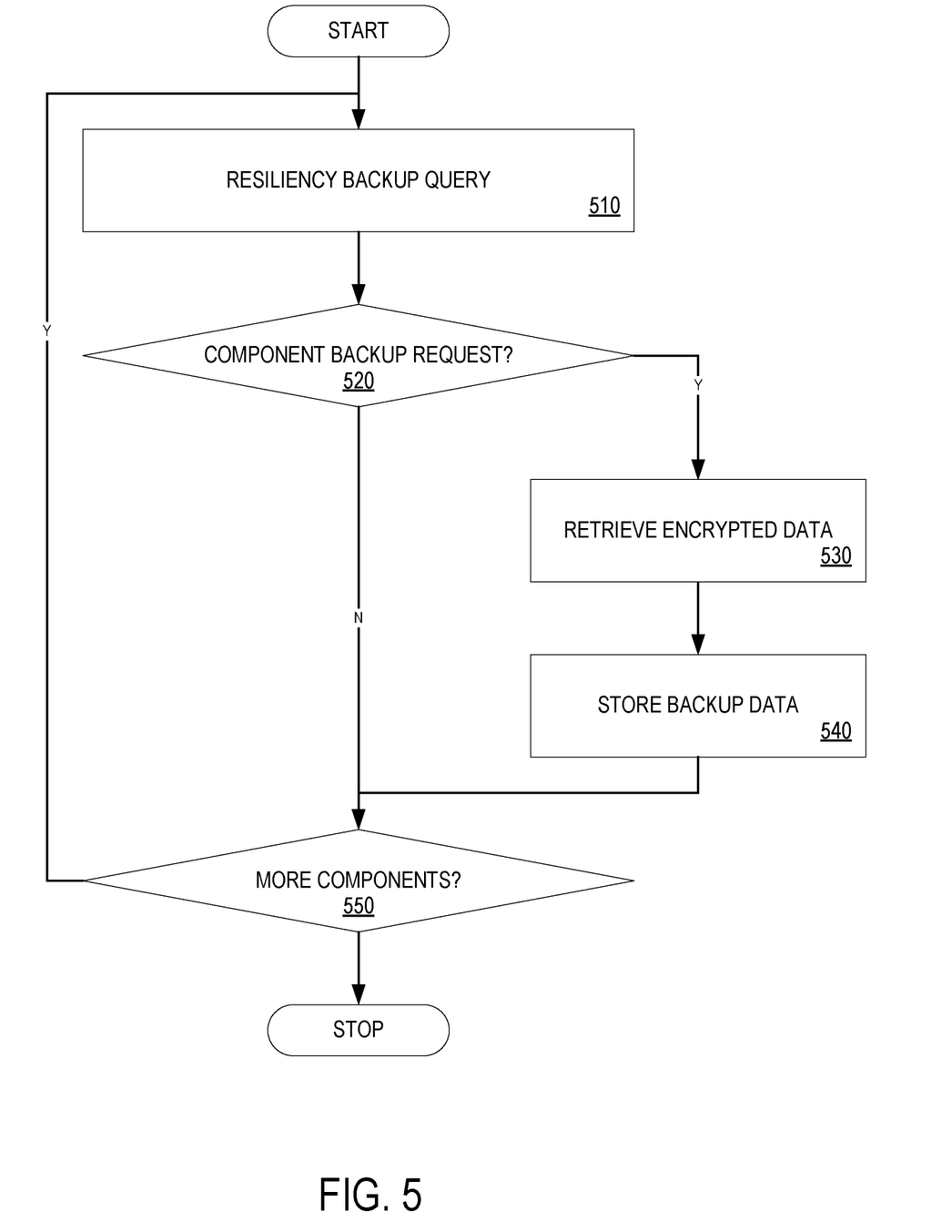
FIG. 5 is a flow diagram illustrating one embodiment of a process for performing resiliency backup.

FIG. 5 is a flow diagram illustrating one embodiment of a process for performing resiliency backup. At processing block 510, a resiliency backup query is performed to determine whether a platform 200 component (e.g., to IP agent 230, security controller 240, TPM 350, etc.). At decision block 520, a determination is made as to whether a component (e.g., a first component) is requesting resiliency backup. If so, encrypted data is retrieved from the component, processing block 530. At processing block 540, the encrypted data is stored at non-volatile memory 250 as backup data. In other embodiments, the backup data may also be stored at secondary firmware storage 320.

Upon a determination at decision block 520, or after the encrypted backup data has been stored, a determination is made as to whether there are more components to query, decision block 550. If so, control is returned to processing block 510, where a resiliency backup query is performed for a subsequent component. Otherwise, all of the components have been queried, and the process has been completed.

In a further embodiment, PDRC 430 invokes agent driver 440 during system boot to determine whether one or more of the system components require data resiliency recovery. In this embodiment, agent driver 440 again transmits a query to each component to check whether the component requests resiliency recovery. Thus, agent driver 440 transmits separate queries to IP agent 230, security controller 240 and TPM 350 to determine whether each agent is to receive data resiliency recovery. Upon a determination that resiliency recovery has been requested by a component, agent driver 440 retrieves the resiliency backup data associated with each component and transmits the backup data to the respective components to provide resiliency recovery. Subsequently, each component receiving the resiliency backup data uses the data as boot critical data during the bootup process.

Figure 6:
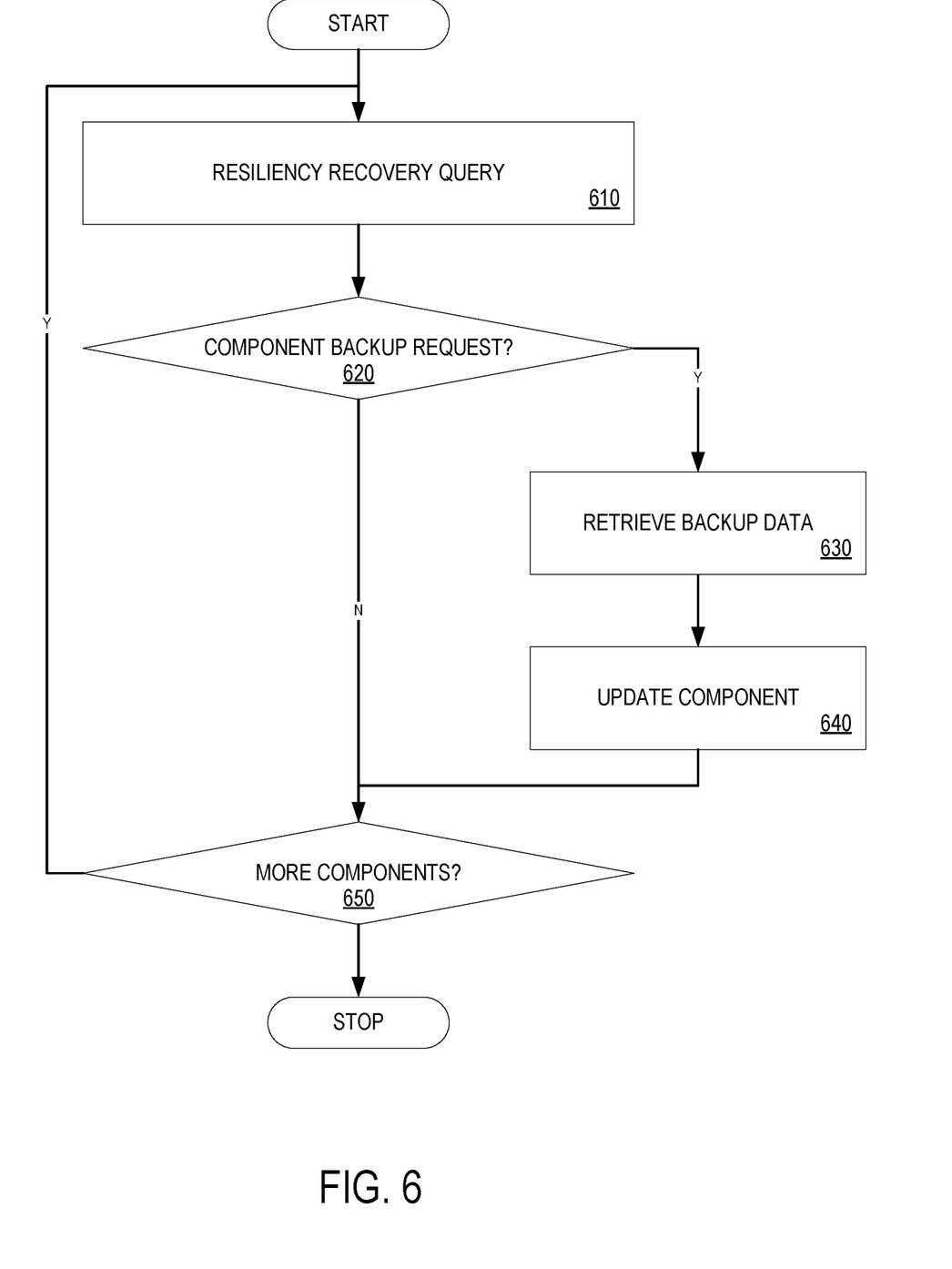
FIG. 6 is a flow diagram illustrating one embodiment of a process for performing resiliency recovery.

FIG. 6 is a flow diagram illustrating one embodiment of a process for performing resiliency recovery. As discussed above, resiliency recovery is performed during a platform 200 boot process. At processing block 610, a resiliency recovery query is performed to determine whether a platform 200 component. At decision block 620, a determination is made as to whether a component (e.g., a first component) is requesting resiliency recovery. If so, backup data associated with the component is retrieved from non-volatile memory 250, processing block 630. In some embodiments, the backup data may be retrieved from secondary firmware storage 320.

At processing block 640, the component is updated with the backup data. Upon a determination at decision block 620, or after the component has been updated, a determination is made as to whether there are more components to query, decision block 650. If so, control is returned to processing block 610, where a resiliency recovery query is performed for a subsequent component. Otherwise, all of the components have been queried, and the process has been completed.

The above-described mechanism provides the capability to store recovery data either in local storage or with data redundancy in a cloud that can be retrieved over an OOB interface. Further, the PDRC has the capability to account for ingredient device(s) that can be scaled from a single node to a cluster (e.g., rack level across a hyper scale data center). Additionally, the mechanism is scalable from a one socket node to a multi-socket (e.g., 2, 4 or 8 sockets) node, or a cluster of nodes (1-n sockets).

Figure 7:
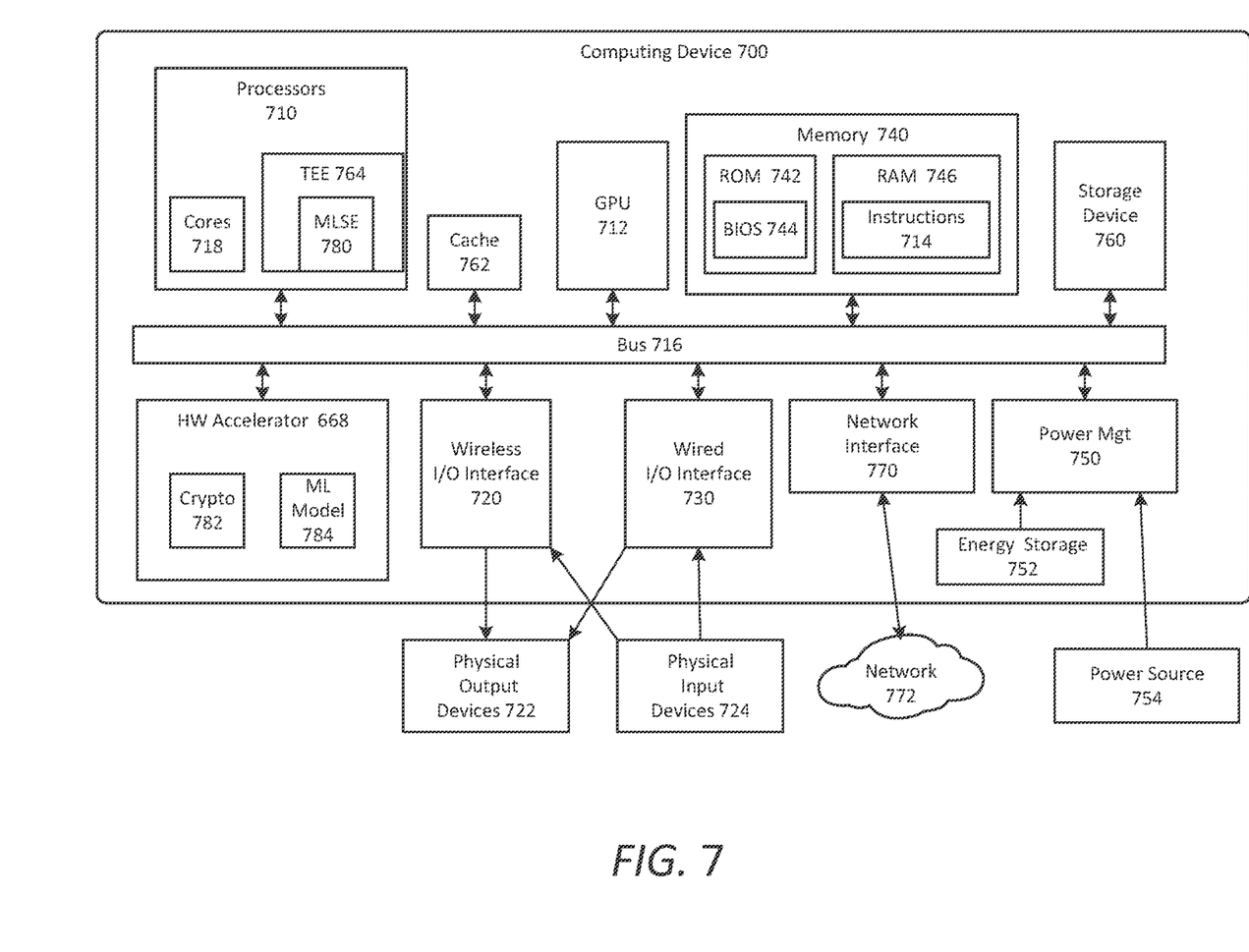
FIG. 7 illustrates one embodiment of a schematic diagram of an illustrative electronic computing device.

FIG. 7 is a schematic diagram of an illustrative electronic computing device to enable enhanced protection against adversarial attacks according to some embodiments. In some embodiments, the computing device 700 includes one or more processors 710 including one or more processors cores 718 and a TEE 764, the TEE including a machine learning service enclave (MLSE) 780. In some embodiments, the computing device 700 includes a hardware accelerator 768, the hardware accelerator including a cryptographic engine 782 and a machine learning model 784. In some embodiments, the computing device is to provide enhanced protections against ML adversarial attacks, as provided in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to facilitate data resiliency in a computer system platform, comprising a non-volatile memory to store data resiliency logic and one or more processors to execute the data resiliency logic to collect boot critical data from a plurality of platform components and store the data within the non-volatile memory.

Example 2 includes the subject matter of Example 1, wherein the one or more processors to execute the data resiliency logic to provide an interface with the plurality of platform components.

Example 3 includes the subject matter of Examples 1 and 2, wherein the one or more processors to execute the data resiliency logic to invoke the interface to transmit a query to each of the plurality of platform components to determine whether one or more of the platform components requests a resiliency data backup.

Example 4 includes the subject matter of Examples 1-3, wherein the one or more processors to execute the data resiliency logic to retrieve the boot critical data from each of the one or more of the platform components requesting the resiliency data backup and store the data in the non-volatile memory as resiliency backup data.

Example 5 includes the subject matter of Examples 1-4, wherein the one or more processors to execute the data resiliency logic during a platform boot to determine whether one or more of the platform components require data resiliency recovery.

Example 6 includes the subject matter of Examples 1-5, wherein the one or more processors to execute the data resiliency logic to invoke the interface to transmit a second query to each of the plurality of platform components to determine whether one or more of the platform components requests the data resiliency recovery.

Example 7 includes the subject matter of Examples 1-6, wherein the one or more processors to execute the data resiliency logic to retrieve the resiliency backup data associated with each of the one or more of the platform components requesting the resiliency data recovery and transmit the resiliency backup data to the one or more of the platform components.

Example 8 includes the subject matter of Examples 1-7, wherein each of the one or more of the platform components requesting the resiliency data recovery uses its associated resiliency backup data as boot critical data during the platform boot.

Some embodiments pertain to Example 9 that includes at least one computer readable medium having instructions stored thereon, which when executed by one or more processors, cause the processors to collect boot critical data from a plurality of platform components and store the data within the non-volatile memory.

Example 10 includes the subject matter of Example 9, having instructions stored thereon, which when executed by one or more processors, further cause the processors to provide an interface with the plurality of platform components.

Example 11 includes the subject matter of Examples 9 and 10, having instructions stored thereon, which when executed by one or more processors, further cause the processors to invoke the interface to transmit a query to each of the plurality of platform components to determine whether one or more of the platform components requests a resiliency data backup.

Example 12 includes the subject matter of Examples 9-11, having instructions stored thereon, which when executed by one or more processors, further cause the processors to retrieve the boot critical data from each of the one or more of the platform components requesting the resiliency data backup and store the data in the non-volatile memory as resiliency backup data.

Example 13 includes the subject matter of Examples 9-12, having instructions stored thereon, which when executed by one or more processors, further cause the processors to determine, during a platform boot, whether one or more of the platform components require data resiliency recovery.

Example 14 includes the subject matter of Examples 9-13, having instructions stored thereon, which when executed by one or more processors, further cause the processors to invoke the interface to transmit a second query to each of the plurality of platform components to determine whether one or more of the platform components requests the data resiliency recovery.

Example 15 includes the subject matter of Examples 9-14, having instructions stored thereon, which when executed by one or more processors, further cause the processors to retrieve the resiliency backup data associated with each of the one or more of the platform components requesting the resiliency data recovery and transmit the resiliency backup data to the one or more of the platform components.

Some embodiments pertain to Example 16 that includes a method to facilitate data resiliency in a computer system platform, comprising collecting boot critical data from a plurality of platform components and storing the data in a non-volatile memory.

Example 17 includes the subject matter of Example 16, further comprising providing an interface with the plurality of platform components.

Example 18 includes the subject matter of Examples 16 and 17, further comprising invoking the interface to transmit a query to each of the plurality of platform components to determine whether one or more of the platform components requests a resiliency data backup.

Example 19 includes the subject matter of Examples 16-18, further comprising retrieving the boot critical data from each of the one or more of the platform components requesting the resiliency data backup and storing the data in the non-volatile memory as resiliency backup data.

Example 20 includes the subject matter of Examples 16-19, further comprising determining, during a platform boot, whether one or more of the platform components require data resiliency recovery.

Example 21 includes the subject matter of Examples 16-20, further comprising invoking the interface to transmit a second query to each of the plurality of platform components to determine whether one or more of the platform components requests the data resiliency recovery.

Example 22 includes the subject matter of Examples 16-21, further comprising retrieving the resiliency backup data associated with each of the one or more of the platform components requesting the resiliency data recovery and transmitting the resiliency backup data to the one or more of the platform components.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
a non-volatile memory to store data resiliency logic; and
one or more processors to execute the data resiliency logic to transmit a query to a plurality of platform components to determine whether one or more of the platform components requests a resiliency data backup, collect boot critical data from the plurality of platform components and store the data within the non-volatile memory.

2. The apparatus of claim 1, wherein the one or more processors to execute the data resiliency logic to provide an interface with the plurality of platform components.

3. The apparatus of claim 2, wherein the one or more processors to execute the data resiliency logic to invoke the interface to transmit the query to the plurality of platform components.

4. The apparatus of claim 1, wherein the one or more processors to execute the data resiliency logic to retrieve the boot critical data from the one or more of the platform components requesting the resiliency data backup and store the data in the non-volatile memory as resiliency backup data.

5. The apparatus of claim 4, wherein the one or more processors to execute the data resiliency logic during a platform boot to determine whether one or more of the platform components require data resiliency recovery.

6. The apparatus of claim 3, wherein the one or more processors to execute the data resiliency logic to invoke the interface to transmit a second query to the plurality of platform components to determine whether one or more of the platform components requests the data resiliency recovery.

7. The apparatus of claim 6, wherein the one or more processors to execute the data resiliency logic to retrieve the resiliency backup data associated with the one or more of the platform components requesting the resiliency data recovery and transmit the resiliency backup data to the one or more of the platform components.

8. The apparatus of claim 7, wherein each of the one or more of the platform components requesting the resiliency data recovery uses associated resiliency backup data as the boot critical data during the platform boot.

9. At least one computer readable medium having instructions stored thereon, which when executed by one or more processors, cause the processors to:
transmit a query to a plurality of platform components to determine whether one or more of the platform components requests a resiliency data backup;
collect boot critical data from the plurality of platform components; and
store the data within a non-volatile memory.

10. The computer readable medium of claim 9, having instructions stored thereon, which when executed by one or more processors, further cause the processors to provide an interface with the plurality of platform components.

11. The computer readable medium of claim 10, having instructions stored thereon, which when executed by one or more processors, further cause the processors to invoke the interface to transmit the query to the plurality of platform components.

12. The computer readable medium of claim 9, having instructions stored thereon, which when executed by one or more processors, further cause the processors to:
retrieve the boot critical data from the one or more of the platform components requesting the resiliency data backup; and
store the data in the non-volatile memory as resiliency backup data.

13. The computer readable medium of claim 12, having instructions stored thereon, which when executed by one or more processors, further cause the processors to determine, during a platform boot, whether one or more of the platform components require data resiliency recovery.

14. The computer readable medium of claim 11, having instructions stored thereon, which when executed by one or more processors, further cause the processors to invoke the interface to transmit a second query to the plurality of platform components to determine whether one or more of the platform components requests the data resiliency recovery.

15. The computer readable medium of claim 14, having instructions stored thereon, which when executed by one or more processors, further cause the processors to:
retrieve the resiliency backup data associated with one or more of the platform components requesting the resiliency data recovery; and
transmit the resiliency backup data to the one or more of the platform components.

16. A method comprising:
transmitting a query to a plurality of platform components to determine whether one or more of the platform components requests a resiliency data backup;
collecting boot critical data from the plurality of platform components; and
storing the data in a non-volatile memory.

17. The method of claim 16, further comprising providing an interface with the plurality of platform components.

18. The method of claim 17, further comprising invoking the interface to transmit a query to the plurality of platform components.

19. The method of claim 16, further comprising:
retrieving the boot critical data from the one or more of the platform components requesting the resiliency data backup; and
storing the data in the non-volatile memory as resiliency backup data.

20. The method of claim 19, further comprising determining, during a platform boot, whether one or more of the platform components require data resiliency recovery.

21. The method of claim 18, further comprising invoking the interface to transmit a second query to the plurality of platform components to determine whether one or more of the platform components requests the data resiliency recovery.

22. The method of claim 21, further comprising:
retrieving the resiliency backup data associated with the one or more of the platform components requesting the resiliency data recovery; and
transmitting the resiliency backup data to the one or more of the platform components.

* * * * *